(12) United States Patent
Sigurbjornsson et al.

(10) Patent No.: US 8,429,176 B2
(45) Date of Patent: Apr. 23, 2013

(54) EXTENDING MEDIA ANNOTATIONS USING COLLECTIVE KNOWLEDGE

(75) Inventors: Borkur Sigurbjornsson, Barcelona (ES); Roelof van Zwol, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 558 days.

(21) Appl. No.: 12/057,587

(22) Filed: Mar. 28, 2008

(65) Prior Publication Data
US 2009/0248610 A1  Oct. 1, 2009

(51) Int. Cl.
G06F 17/30  (2006.01)

(52) U.S. Cl.
USPC .......................................... 707/750; 707/765

(58) Field of Classification Search .................. 707/713, 707/736, 765, 766, 750
See application file for complete search history.

(56) References Cited

U.S. PATENT DOCUMENTS

| | | | |
|---|---|---|---|
| 6,223,183 B1* | 4/2001 | Smith et al. ............................. 1/1 |
| 6,882,970 B1* | 4/2005 | Garner et al. ................... 704/236 |
| 7,093,012 B2* | 8/2006 | Olstad et al. ................... 709/224 |
| 7,685,198 B2* | 3/2010 | Xu et al. ........................ 707/748 |
| 7,870,135 B1* | 1/2011 | Cheung .......................... 707/737 |
| 8,232,996 B2* | 7/2012 | Bailloeul et al. ............... 345/440 |
| 2003/0061028 A1* | 3/2003 | Dey et al. .......................... 704/9 |
| 2004/0080726 A1* | 4/2004 | Suh et al. ....................... 353/122 |
| 2004/0138946 A1* | 7/2004 | Stolze .............................. 705/14 |
| 2004/0204965 A1* | 10/2004 | Gueck et al. ...................... 705/3 |
| 2005/0004930 A1* | 1/2005 | Hatta ............................. 707/102 |
| 2005/0209989 A1* | 9/2005 | Albornoz et al. ................. 707/1 |
| 2005/0234958 A1* | 10/2005 | Sipusic et al. ................. 707/102 |
| 2006/0264209 A1* | 11/2006 | Atkinson et al. ............ 455/422.1 |
| 2007/0100680 A1* | 5/2007 | Kumar et al. .................... 705/10 |
| 2008/0010226 A1* | 1/2008 | Brinker et al. .................. 706/12 |
| 2008/0025617 A1* | 1/2008 | Posse et al. .................... 382/224 |
| 2008/0201302 A1* | 8/2008 | Kimchi et al. .................... 707/3 |
| 2008/0215583 A1* | 9/2008 | Gunawardena et al. .......... 707/7 |
| 2009/0043799 A1* | 2/2009 | Morris .......................... 707/102 |
| 2009/0089252 A1* | 4/2009 | Galitsky et al. ................... 707/3 |
| 2009/0094189 A1* | 4/2009 | Stephens ........................... 707/2 |

* cited by examiner

*Primary Examiner* — Thu-Nguyet Le
*Assistant Examiner* — Andalib Lodhi
(74) *Attorney, Agent, or Firm* — Greenberg Traurig, LLP

(57) ABSTRACT

The present invention is directed towards systems and methods for extending media annotations using collective knowledge. The method according to one embodiment of the present invention comprises receiving a plurality of content items and associated annotations. The method further normalizes the plurality of associated annotations and calculates pair frequencies for the plurality of associated annotations. The method then retrieves a plurality of alternative annotations and provides the plurality of alternative annotations.

24 Claims, 4 Drawing Sheets

EXTENDING MEDIA ANNOTATIONS USING COLLECTIVE KNOWLEDGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to improving annotation of user submitted content items. More specifically, the present invention is directed towards systems, methods and computer program products for automatically providing a plurality of suggested annotations using collective knowledge.

BACKGROUND OF THE INVENTION

The global and open nature of the Internet has aided the rapid growth of multimedia sharing sites, two examples of which are FLICKR® and JUMPCUT®. One of the basic functionalities of content sharing sites is to provide a user with the ability to annotate or "tag" content items with textual descriptions of the submitted media. For example, a user may tag a picture of the Eiffel tower with the annotations "Eiffel tower", "Paris" and "France."

The use of annotations in content sharing sites allows users to search for a given content item using well known text searching techniques and algorithms. Additionally, they allow content items to be treated as textual data in a variety of useful ways, such as categorizing content items, linking associated content items to a given content item, etc. Putting total control in a user's hands, however, results in a less than perfect data set. Indeed, the global nature of the Internet quickly increases the rate of incomplete information associated with a given content item.

Thus there is a need in the art to provide systems, methods and computer program products for extending user annotations with related annotations based on an initial set of user-supplied annotations. By supplying the user with a list of possible annotations to include in addition to his or her own annotations, a system may become more robust by allowing a user to fully describe his or her content items with terms he or she may not have originally considered. Additionally, a more robust database allows other users to locate and browse content items more effectively, as data describing content items is thoroughly defined.

SUMMARY OF THE INVENTION

The present invention is directed towards systems, methods and computer program products for extending media annotations using collective knowledge. The method of the present invention comprises receiving a plurality of content items and associated annotations. In one embodiment, receiving a plurality of content items and associated annotations comprises receiving the content items and associated annotations from a user. In an alternative embodiment, retrieving one or more associated annotations comprises retrieving a plurality of lists, a given list associated with a received annotation; wherein the method further comprises merging the plurality of lists.

The method further comprises normalizing the one or more associated annotations and calculating pair frequencies for the one or more associated annotations. In one embodiment, calculating pair frequencies comprises normalizing the pair frequency with an overall frequency of the annotations. In a first embodiment, normalizing the pair frequency comprises a symmetric normalization method. In a second embodiment, normalizing the pair frequency comprises an asymmetric normalization method.

The method may further comprise retrieving one or more alternative annotations using the pair frequencies and providing the one or more alternative annotations. In an alternative embodiment, the method of the present invention may further comprise ranking the alternative annotations. In one embodiment, ranking is based on a voting algorithm wherein the voting algorithm is further operative to rank the alternative annotations according to a promotion algorithm. In an alternative embodiment, ranking is based on a summing algorithm, wherein the summing algorithm is operative to rank the one or more alternative annotations according to a promotion algorithm.

The system of the present invention comprises a plurality of client devices coupled to a network and a content server operative to receive a plurality of content items and associated annotations. In one embodiment, receiving a plurality of content items and associated annotations comprises receiving the content items and associated annotations from a user.

The system further comprises an annotation aggregation component operative to normalize the associated annotations and calculate pair frequencies for the associated annotations. In one embodiment, calculating pair frequencies comprises normalizing the pair frequency with an overall frequency of the annotations. In a first embodiment, normalizing the pair frequency comprises a symmetric normalization method. In a second embodiment, normalizing the pair frequency comprises an asymmetric normalization method.

The system further comprises a co-occurrence database operative to store alternative annotations and annotation frequencies and an annotation extension component operative to retrieve one or more alternative annotations from the co-occurrence database using the pair frequencies and provide the plurality of alternative annotations. In one embodiment, retrieving one or more alternative annotations comprises retrieving a plurality of lists, a given list associated with a received annotation. In a further embodiment, annotation extension component is further operative to merge the plurality of lists. In a second embodiment, annotation extension component is further operative to rank the retrieved one or more alternative annotations. In a first embodiment, ranking is based on a summing algorithm, wherein the summing algorithm is operative to rank the one or more alternative annotations according to a promotion algorithm. In a second embodiment, ranking is based on a voting algorithm wherein the voting algorithm is further operative to rank the alternative annotations according to a predetermined promotion algorithm.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
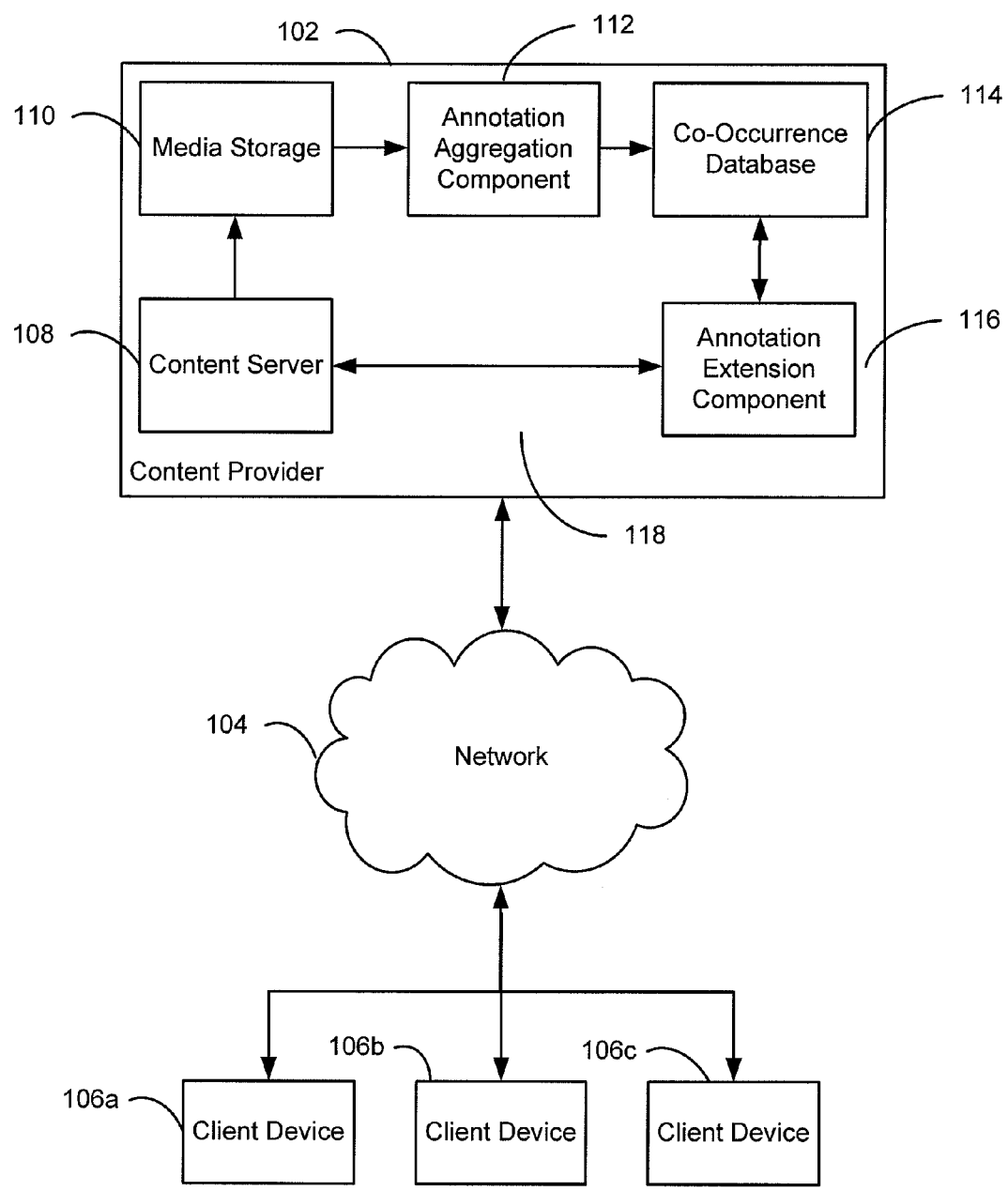
FIG. 1 presents a block diagram depicting a system for extending content item annotations using collective knowledge according to one embodiment of the present invention.

FIG. 1 presents a block diagram depicting a system for extending content item annotations using collective knowledge according to one embodiment of the present invention. According to the embodiment that FIG. 1 illustrates, at least a plurality of client devices 106a, 106b and 106c are communicatively coupled to a network 104, which may include a connection to one or more local or wide area networks, such as the Internet. A given client device 106a, 106b, 106c is in communication over the network 104 with a content provider 102. According to the present embodiment, a content provider 102 comprises a content server 108 operative to receive data requests from a given client device 106a, 106b, 106c and return appropriate or otherwise relevant data in response to the received data requests. In addition to a content server 108, a content provider 102 further comprises media storage 110.

Media storage 110 may be operative to store a plurality of content items as well as annotations (also referred to herein as "tags") associated with a given one of the plurality of content items. For example, a stored image of the Eiffel Tower may be associated with the annotations "paris" and "eiffel tower." Media storage 110 may be operative to store images, video, audio or any other content format as known in the art. According to the present embodiment, a content server 108 may receive content items. In alternative embodiments, content items may be received by an alternative source such as a second storage module (not shown). In one embodiment, media storage 110 may comprise a relational database operative to store the aforementioned data. In alternative embodiment, other databases, flat files or alternative storage mechanisms may be used as known to those of skill in the art.

Media storage 110 is communicatively coupled to an annotation aggregation component 112 operative to process one or more incoming annotated content items. In one embodiment, the annotation aggregation component 112 normalizes incoming data objects, as well as calculates how frequently a pair of tags co-occurs in among annotations across a plurality of content items. Additionally, annotation aggregation component 112 is operative to update a co-occurrence database 114, as is described herein in greater detail.

Co-occurrence database 114 is operative to store data regarding annotation pairs and annotation pair frequency across a plurality of content items. In one embodiment, co-occurrence database 114 may comprise a relational database management system operative to store an annotation pair and an associated "pair count," which may indicate the frequency with which an annotation pair occurs. As is discussed further, co-occurrence database 114 stores statistical information regarding content items and co-occurrence frequency related to the content items The annotation extension component 116 is operative to receive a plurality of annotated content items from co-occurrence database 114. In accordance with the present embodiment, annotation extension component 116 is operative to generate a list of annotations that extend or otherwise supplement the original annotations associated with a given content item. In one embodiment, original annotations may comprise user submitted annotations. In addition to generating a plurality of suggested annotations, annotation extension component 116 may be operative to rank one or more suggested annotations. That is, in response to a set of user annotations, annotation extension component may be operative to return an ordered list of suggested additional annotations to a given user. The process of ranking annotations is described in greater detail with respect to FIG. 2.

Annotation extension component 116 may further be operative to transmit an ordered list of annotations to content server 108 for presentation to a given user. In one embodiment, annotation suggestions are provided as a list of selectable items presented within a graphical user interface.

Figure 2:
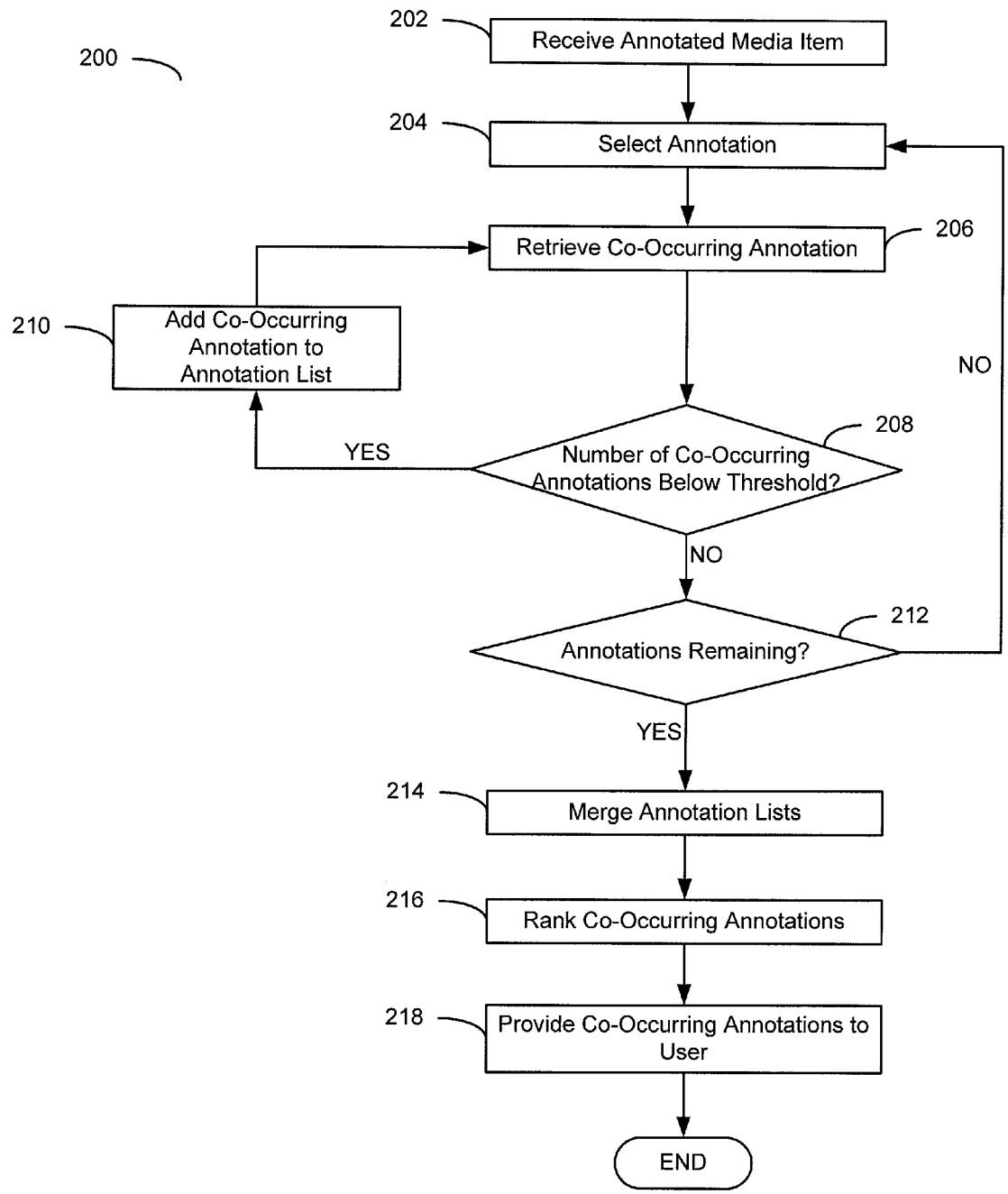
FIG. 2 presents a flow diagram illustrating a method for providing extended content item annotations to a user according to one embodiment of the present invention.

FIG. 2 presents a flow diagram illustrating a method for providing extended content item annotations to a user according to one embodiment of the present invention. The method 200 receives an annotated content item, step 202. In one embodiment, an annotated content item may comprise image or video data as well as associated metadata (annotations, tags, etc.) such as textual descriptions of the image or video data. The method 200 selects an annotation associated with a given content item, step 204, and a co-occurring annotation associated with the selected annotation is retrieved, step 206. In one embodiment, co-occurring annotations may be retrieved from a database of annotations and according to a plurality of governing equations, as is described in greater detail herein. An exemplary process for populating a co-occurrence database is described further with respect to FIG. 3.

If the number of retrieved co-occurring annotations is below a threshold, step 208, which may be a predetermined threshold, the method 200 adds the retrieved co-occurring annotation of a list of annotations associated with the selected annotation, step 210. In one embodiment, a system administrator or similar system operator may determine a threshold. A list of annotations may comprise an in-memory data structure operative to store a list of data items. Alternatively, a list of annotations may comprise a flat file or temporary file stored on disk operative to store the list of annotations.

If the number of retrieved co-occurring annotations is above a threshold, step 208, the method 200 checks to determine whether there annotations exist that are remaining to be analyzed, step 212. If annotations remain to be analyzed, steps 204, 206, 208, 210 and 212 may repeat until analysis of all the annotations occurs.

Upon analyzing the media item annotations, the method 200 merges the annotation lists, step 214. The method 200 then ranks the merged list of co-occurring annotations, step 216. In one embodiment, merging and ranking the annotation lists comprises utilizing a voting scheme for generating an ordered, merged list of annotations. Given, a set of user-defined tags U of tags u∈U, a set of generated (or "candidate") tags, CU comprising a plurality of candidate tags c associated with a user submitted tag u, a voting function may be employed on a given user tag and candidate tag having the form:

$$\text{vote}(u, c) = \begin{cases} 1 & \text{if } c \in C_u \\ 0 & \text{otherwise} \end{cases} \quad \text{Equation 1}$$

Equation 1 illustrates a voting equation operative to compute a score for a given candidate tag $C \epsilon C_u$, where a vote for c is cast whenever $c \epsilon C_u$. A list of recommended tags R is obtained by sorting the candidate tags on the number of votes, as defined by Equation 2:

$$\text{score}(c) := \sum_{u \in U} \text{vote}(u, c) \quad \text{Equation 2}$$

In addition to calculating the voting score for a given candidate annotation, one or more other metrics may be calculated to promote or demote a given candidate annotation. A first metric may comprise a stability function (as Equation 3 illustrates) that defines a weighting function that weights the impact of the candidate tags for a given user-defined tag. According to one embodiment, the parameter $k_s$ is configured at training phase and may be re-adjusted to the preference of a system operator.

$$\text{stability}(u) := \frac{k_s}{k_s + \text{abs}(k_s - \log(|u|))} \quad \text{Equation 3}$$

Additionally, annotations with very high frequency are likely to be too general for individual content items, thus Equation 4 promotes the descriptiveness by damping the contribution of candidate tags with a very high frequency. Equation 4 represents another weighting function applied to re-value the weight of a candidate tag. The parameter $k_d$ is configured during at training phase of the present invention and may be re-adjusted to the preference of a system operator.

$$\text{descriptive}(c) := \frac{k_d}{k_d + \text{abs}(k_d - \log(|c|))} \quad \text{Equation 4}$$

Finally, the co-occurrence values of tags provide good estimates of the relevance of a candidate tag for a user-defined tag. In principle, this is already used by the aggregation strategy for summing, but co-occurrence values may decline very fast. The rank promotion function (Equation 5) does not look at the co-occurrence value, but at the position r of the candidate tag $c \epsilon C_u$ for a given user-defined tag u utilizing a damping parameter $k_r$:

$$\text{rank}(u, c) := \frac{k_r}{k_r + (r - 1)} \quad \text{Equation 5}$$

The formulas of Equations 3, 4 and 5 may be combined to produce a promotion function for a given user/candidate tag pair as illustrated in Equation 6:

$$\text{promotion}(u,c) := \text{rank}(u,c) \cdot \text{stability}(u) \cdot \text{descriptive}(c) \quad \text{Equation 6}$$

Utilizing the promotion parameter defined in Equation 6, the score function of Equation 2 may be modified to utilize the promotion factor as illustrated in Equation 7.

$$\text{score}(c) := \sum_{u \in U} \text{vote}(u, c) \cdot \text{promotion}(u, c) \quad \text{Equation 7}$$

Alternatively, merging the generated annotation lists may comprise employing a summing algorithm operative to take the union of candidate tag lists (C) and sum over the co-occurrence values of the tags $c \epsilon C_u$ as illustrated in Equation 8.

$$\text{score}(c) := \sum_{u \in U} (P(c \mid u), \text{if } c \in C_u) \quad \text{Equation 8}$$

As illustrated in Equation 8, the function P(c|u) calculates the asymmetric co-occurrence value. In one embodiment, an asymmetric co-occurrence value may be defined according to Equation 9 which calculates how often the annotation $t_i$ co-occurs with tag $t_j$ normalized by the total frequency of tag $t_i$.

$$P(t_j \mid t_i) := \frac{|t_i \cap t_j|}{|t_i|} \quad \text{Equation 9}$$

Equation 9 represents an asymmetric measurement of co-occurrence. Alternatively, a symmetric measurement may be applied as defined by Equation 10.

$$j(t_i \mid t_j) := \frac{|t_i \cap t_j|}{|t_i \cup t_j|} \quad \text{Equation 10}$$

As can be seen in Equation 10, $J(t_i, t_j)$ represents the Jaccard similarity coefficient between inputs $t_i$ and $t_j$. Additionally, the summing equation illustrated in FIG. 8 may be further enhanced with a promotion function, such as that described with respect to Equation 6, as illustrated in Equation 11.

$$\text{score}(c) := \sum_{u \in U} (\text{promotion}(u, c) \cdot P(c \mid u), \text{if } c \in C_u) \quad \text{Equation 11}$$

The method 200 provides the co-occurring annotations to a given user, step 218. In one embodiment, providing the co-occurring annotations may comprise providing a list of annotations labeled as "suggested" annotations. For example, if a user enters the annotation "Eiffel tower", a list of suggested annotations comprising the annotations "Paris", "France" and "landmarks" may be presented to the user via a graphical user interface ("GUI") such as a webpage. The GUI may be operative to allow a user to select a plurality of suggested annotations for inclusion in the content item annotations. Alternatively, the list of co-occurring annotations may be automatically added to a given content data item without user knowledge. In this embodiment, the added annotations may be used in content retrieval, allowing subsequent users to locate a given content based on both the user-supplied annotations and the annotations generated by the method 200.

Figure 3:
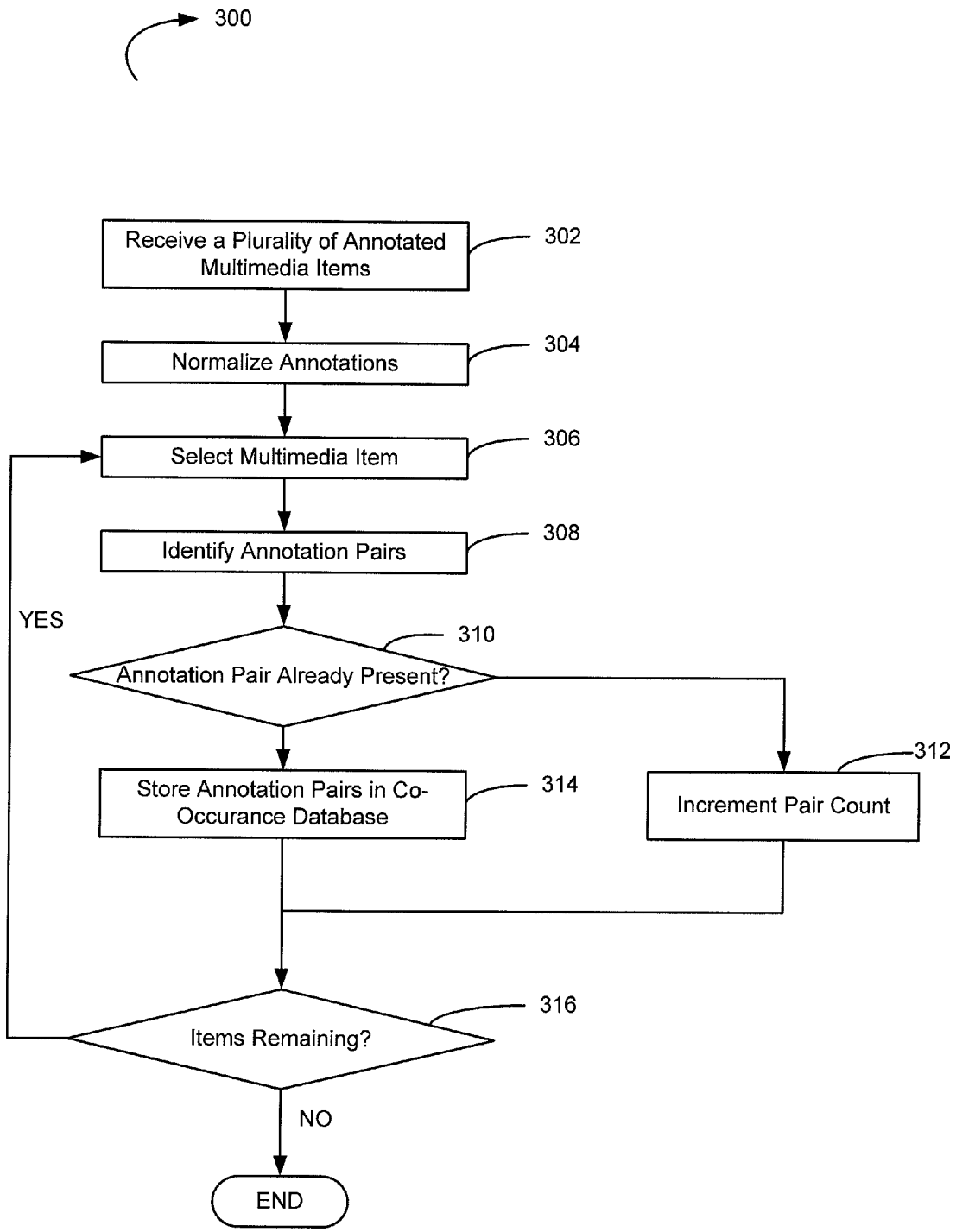
FIG. 3 provides a flow diagram illustrating a method for populating a co-occurrence database according to one embodiment of the present invention.

FIG. 3 provides a flow diagram illustrating a method for populating a co-occurrence database according to one embodiment of the present invention. As FIG. 3 illustrates, the method 300 receives a plurality of annotated content items, step 302. In one embodiment, one or more of annotated content items are received in response to a submission from a user. For example, the method 300 may be invoked upon submission of a plurality of content items from a given user. Alternatively, or in conjunction with the foregoing, the received plurality of content items may be received via a batch process. That is, a plurality of previously stored content items may be forwarded to the method 300 for analysis at a predetermined time or at a predetermined interval.

Upon receiving a plurality of content items, the method 300 normalizes the received content items, step 304. Normalization may comprise a variety of normalization techniques known in the art, such as standard text transformations, such as lowercasing, lemmatization or any normalization technique known in the art.

The method 300 then selects a given content item, step 306, and identifies annotation pairs associated with the given content item, step 308. The method 300 queries an annotation store to determine if an identified annotation pair has been previously entered, step 310. If the identified annotation pair has been previously entered, a pair count is incremented, step 312. A "pair count" is used to record the number of times the method 300 detects a given annotation pair. In one embodiment, this count may be utilized to determine the relevance of a given annotation pair. That is, an annotation pair with a higher pair count may be determined to be a more relevant pair when compared with pairs having a lower frequency. Additionally, the use of a pair count enables errors in annotating to be essentially eliminated from repetition. For example, the pair ("Paris", "France") may be substantially higher than a pair ("Paris", "France"), as the latter represents a human typographical error in the entry of the term "France". Alternatively, if the annotation pair is not found within the co-occurrence database, the pair is added, step 316.

If the pair has not been entered into the co-occurrence database, it may be stored and the pair count associated with the entry initialized. In one embodiment, the pair count is initialized to a value of one. The method 300 then determines whether there are any content items left from the one or more received items, step 316. If more items exist within the received items, the method 300 repeats steps 306, 308, 310, 312, 314 and 316. If not additional items require examination, the method 300 ends.

Figure 4:
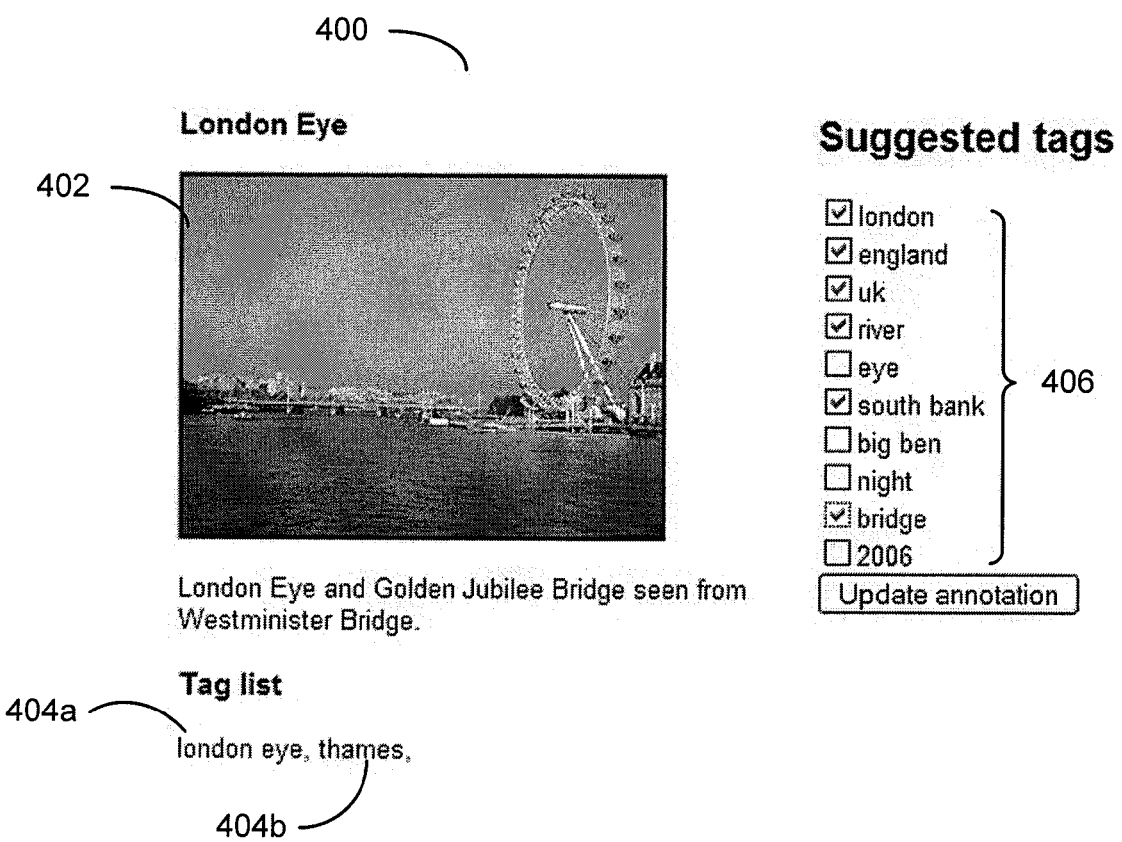
FIG. 4 provides a screen diagram illustrating one embodiment for providing a user with alternative annotations on the basis of an initial set of user-supplied annotations.

FIG. 4 provides a screen diagram illustrating one embodiment for providing a user with alternative annotations on the basis of an initial set of one or more user-supplied annotations. As FIG. 4 illustrates, a user is interacts with a GUI depicting the user-submitted content item 402, user-submitted annotations 404a, 404b and a plurality of suggested annotations 406 retrieved via the methodologies previously described.

In one method of operation, a user may upload a content item 402 and manually assign one or more annotations 404a and 404b that he or she believes adequately describe the content item 402. In one embodiment, a user submits the content item 402 and annotations 404a and 404b and the GUI presents a list of suggested annotations 406. In an alternative embodiment, suggested annotations 406 may be retrieved asynchronously without explicit user submission.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for extending media annotations using collective knowledge, the method comprising:
   receiving a plurality of content items and associated annotations;
   normalizing the plurality of associated annotations;
   identifying pairs of co-occurring annotations in the plurality of content items;
   calculating a frequency with which each pair of co-occurring annotations occur in the plurality of content items;
   retrieving one or more alternative annotations from the pairs of annotations based on the calculated frequency;
   providing the one or more alternative annotations; and
   retrieving one or more additional content items based on the one or more alternative annotations.

2. The method of claim 1 wherein receiving a plurality of content items and associated annotations comprises receiving the content items and associated annotations from a user.

3. The method of claim 1 wherein retrieving the one or more alternative annotations comprises retrieving a plurality of lists, each list associated with a received annotation.

4. The method of claim 3 comprises merging the plurality of lists.

5. The method of claim 1 comprises ranking the retrieved one or more alternative annotations.

6. The method of claim 5 wherein the ranking is based on a voting algorithm.

7. The method of claim 5 wherein the ranking is based on a summing algorithm.

8. The method of claim 6 wherein the voting algorithm is operative to rank the one or more alternative annotations according to a promotion algorithm.

9. The method of claim 7 wherein the summing algorithm is operative to rank the one or more alternative annotations according to a promotion algorithm.

10. The method of claim 1 wherein calculating the frequency comprises normalizing the frequency with an overall frequency of the annotations.

11. The method of claim 10 wherein the normalizing the frequency comprises a symmetric normalization method.

12. The method of claim 10 wherein the normalizing the frequency comprises an asymmetric normalization method.

13. A system for extending media annotations using collective knowledge, the system comprising:
   a content server computer coupled over a network to one or more client devices, the content server computer operative to receive a plurality of content items and associated annotations;
   an annotation aggregation component operative to normalize the plurality of associated annotations, identifying pairs of co-occurring annotations in the plurality of content items, and calculate a frequency with which each pair of co-occurring annotations occur in the plurality of content items;
   a co-occurrence database operative to store alternative annotations from the pairs of annotations and frequencies of co-occurring annotation pairs which occur across the plurality of content items; and
   an annotation extension component operative to retrieve one or more alternative annotations stored in the co-occurrence database based on the stored frequencies, provide the one or more alternative annotations and retrieve one or more additional content items based on the one or more alternative annotations.

14. The system of claim 13 wherein said content server is further operative to receive the content items and associated annotations from a user.

15. The system of claim 13 wherein said annotation extension component is further operative to retrieve one or more lists, each list associated with a received annotation.

16. The system of claim 15 wherein the annotation extension component is operative to merge the plurality of lists.

17. The system of claim 13 wherein the annotation extension component is operative to rank the retrieved plurality of alternative annotations.

18. The system of claim 17 wherein the ranking is based on a voting algorithm.

19. The system of claim 17 wherein the ranking is based on a summing algorithm.

20. The system of claim 18 wherein the voting algorithm is operative to rank the one or more alternative annotations according to a predetermined promotion algorithm.

21. The system of claim 19 wherein the summing algorithm is operative to rank one or more alternative annotations according to a predetermined promotion algorithm.

22. The system of claim 13 wherein said annotation aggregation component is further operative to normalize the frequency with an overall frequency of the annotations.

23. The system of claim 22 wherein the normalizing the frequency comprises a symmetric normalization method.

24. The system of claim 22 wherein the normalizing the frequency comprises an asymmetric normalization method.

* * * * *